(12) United States Patent
Mese et al.

(10) Patent No.: US 11,694,574 B2
(45) Date of Patent: Jul. 4, 2023

(54) ALTERATION OF ACCESSIBILITY SETTINGS OF DEVICE BASED ON CHARACTERISTICS OF USERS

(71) Applicant: Lenovo (Singapore) Pte. Ltd., Singapore (SG)

(72) Inventors: John Carl Mese, Cary, NC (US); Arnold S. Weksler, Raleigh, NC (US); Mark Patrick Delaney, Raleigh, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 330 days.

(21) Appl. No.: 16/535,815

(22) Filed: Aug. 8, 2019

(65) Prior Publication Data
US 2021/0043109 A1 Feb. 11, 2021

(51) Int. Cl.
*G09B 21/00* (2006.01)

(52) U.S. Cl.
CPC ......... *G09B 21/006* (2013.01); *G09B 21/008* (2013.01); *G09B 21/009* (2013.01)

(58) Field of Classification Search
CPC .................................................. G06B 21/00
See application file for complete search history.

(56) References Cited

U.S. PATENT DOCUMENTS

| | | | | |
|---|---|---|---|---|
| 6,523,954 B1* | 2/2003 | Kennedy | .............. | A61B 5/0013 351/205 |
| 8,248,528 B2* | 8/2012 | Hosking | ................ | H04N 7/165 348/468 |
| 8,284,999 B2* | 10/2012 | Kurzweil | .............. | G09B 21/006 382/114 |
| 8,494,507 B1* | 7/2013 | Tedesco | ............... | G09B 21/009 455/418 |
| 8,891,817 B2* | 11/2014 | Wexler | ................. | H04N 5/2252 382/100 |
| 8,943,021 B2* | 1/2015 | Cuttner | ............... | G06F 16/7844 707/610 |
| 9,095,423 B2* | 8/2015 | Wexler | .............. | G06K 9/00671 |
| 9,208,676 B2* | 12/2015 | Fadell | .................... | G08B 19/00 |
| 9,229,616 B2* | 1/2016 | Peterson | .............. | G06F 3/0482 |
| 9,443,507 B2* | 9/2016 | Winter | .................... | G10L 15/22 |
| 9,824,271 B2* | 11/2017 | Whritenor | ............ | G06K 9/0061 |
| 9,836,996 B2* | 12/2017 | Kanuganti | ......... | H04N 21/2743 |
| 10,037,676 B1* | 7/2018 | Scharf | ...................... | G06F 8/61 |
| 10,165,225 B2* | 12/2018 | Thelin | .................... | H04N 7/147 |
| 10,332,059 B2* | 6/2019 | Matsuoka | ............ | G06Q 10/083 |
| 10,372,788 B2* | 8/2019 | Landau | .................. | G09B 17/00 |
| 10,645,439 B2* | 5/2020 | Card, II | .................. | G06F 3/016 |

(Continued)

Primary Examiner — K. Wong
(74) Attorney, Agent, or Firm — John M. Rogitz; John L. Rogitz

(57) ABSTRACT

In one aspect, a device includes at least one processor and storage accessible to the at least one processor. The storage includes instructions executable by the at least one processor to receive input from at least one sensor, identify a characteristic of a user based on the input from the at least one sensor, and alter at least one setting of the device based on the identification of the characteristic. The at least one setting is related to presentation of content using the device.

20 Claims, 8 Drawing Sheets

(56) References Cited

U.S. PATENT DOCUMENTS

| | | | |
|---|---|---|---|
| 2005/0211768 A1* | 9/2005 | Stillman | G07F 17/16 |
| | | | 235/381 |
| 2014/0267642 A1* | 9/2014 | Wexler | G06K 9/00671 |
| | | | 348/62 |
| 2017/0116736 A1* | 4/2017 | Yoshioka | A61B 5/163 |
| 2018/0150692 A1* | 5/2018 | Cho | G09G 5/30 |
| 2019/0179405 A1* | 6/2019 | Sun | G06Q 30/0643 |
| 2019/0318181 A1* | 10/2019 | Katz | A61B 5/163 |
| 2019/0340732 A1* | 11/2019 | Qin | G06T 7/60 |
| 2020/0081224 A1* | 3/2020 | Shigemitsu | G02B 1/06 |
| 2020/0183713 A1* | 6/2020 | Verma | G06F 9/452 |
| 2020/0213446 A1* | 7/2020 | Hardy | H04M 11/007 |
| 2020/0257893 A1* | 8/2020 | Trani | G06K 9/00288 |
| 2020/0366671 A1* | 11/2020 | Larson | H04L 63/0861 |
| 2020/0371349 A1* | 11/2020 | Katz | G02B 27/0101 |
| 2021/0089782 A1* | 3/2021 | Weerasinghe | G06K 9/00744 |

* cited by examiner

SETTINGS

- ENABLE SETTINGS ADJUSTMENTS FOR USERS AND DISABILITIES THE SYSTEM IDENTIFIES *1202*

ACCESSIBILITY OPTIONS

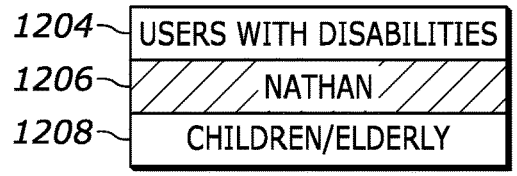

- LARGE FONT *1210*
- CONTENT/IMAGE ZOOMING *1212*
- READ TEXT USING TTS *1214*
- PRESENT AUDIO AS TEXT *1216*
- USE CC FOR AUDIO VIDEO CONTENT *1218*
- USE DETECTED LANGUAGE *1220*

FOR NATHAN :

- CHANGE TO THESE SETTINGS WHEN HE'S NOT WEARING GLASSES *1222*
- ONLY CHANGE TO THESE SETTINGS FROM: *1224*

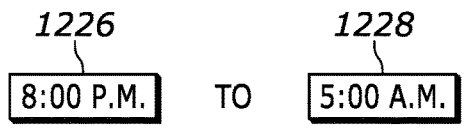

- ONLY CHANGE TO THESE SETTINGS AT: *1230*

FIG. 12

ALTERATION OF ACCESSIBILITY SETTINGS OF DEVICE BASED ON CHARACTERISTICS OF USERS

FIELD

The present application relates to technically inventive, non-routine solutions that are necessarily rooted in computer technology and that produce concrete technical improvements. In particular, the present application relates to adjustment of settings of a device based on characteristics of one or more users that are detected by the device.

BACKGROUND

As recognized herein, many children, elderly, and people with certain disabilities use computers just like others in the increasingly technology-centric world in which we live. However, as also recognized herein, computers are not typically set to their needs and these individuals may not be able to configure a computer to their needs themselves. There are currently no adequate solutions to the foregoing computer-related, technological problem.

SUMMARY

Accordingly, in one aspect a device includes at least one processor and storage accessible to the at least one processor. The storage includes instructions executable by the at least one processor to receive input from at least one sensor and to determine whether a user has a disability based on the input. The instructions are also executable to alter an accessibility setting of the device based on a determination that the user has a disability.

In some examples, the accessibility setting may be altered for text to be presented on a display accessible to the at least one processor in a relatively larger font size than prior to alteration of the accessibility setting. The accessibility setting(s) may also be altered for text to be presented audibly to the user, for visual content to be zoomed in on relative to presentation of the visual content prior to alteration of the accessibility setting, for audible content to be presented as text on a display accessible to the at least one processor, and/or for turning on closed captioning for audio video content.

Also in some examples, the disability may be a vision impairment, a hearing impairment, and/or a motor skills impairment. Additionally, in certain implementations the at least one sensor may include a camera accessible to the at least one processor and/or a microphone accessible to the at least one processor.

In another aspect, a method includes receiving input from at least one sensor and identifying a characteristic of a user based on the input from the at least one sensor. The method also includes altering at least one setting of a device based on the identifying of the characteristic. The at least one setting is related to presentation of content using the device.

In some implementations, the method may include identifying a particular user based on the input from the at least one sensor and then altering the at least one setting of the device based on the at least one setting already being associated with and tailored to the particular user. Additionally or alternatively, the method may include, based on identifying that a particular user has worn eye glasses in the past but is not currently wearing eye glasses, altering the at least one setting by one or more of presenting text on a display in a relatively larger font size than a default font size and audibly representing text presented on the display.

Even further, in some implementations the method may include profiling the user based on input from the at least one sensor and then altering the at least one setting based on the profiling. In some examples, the user may be profiled as a child and the altering of the at least one setting may include configuring a first setting for the device to audibly represent text presented on a display. In other examples, the user may be profiled as an elderly person and the altering of the at least one setting may include configuring a first setting for the device to present text on a display in a relatively larger font size than a default font size. In still other examples, the user may be profiled as preferring to use a first language different from a second language in which content is being or will be presented, and the at least one setting may be altered by converting at least some of the content from the second language to the first language.

Additionally, if desired the device may be a first device, the at least one sensor may include a network interface, and identification of a second device as being within a threshold distance to the first device may be used to identify that the at least one setting is to be altered. In these examples, the second device may be associated with the user, and the identification of the second device as being within the threshold distance to the first device may be based on input from the network interface.

In still another aspect, a computer readable storage medium (CRSM) that is not a transitory signal includes instructions executable by at least one processor to receive input from at least one sensor accessible to the at least one processor, identify a characteristic of a user based on the input from the at least one sensor, and change at least one setting of a device based on the identification of the characteristic. The at least one setting is related to presentation of content.

In some examples, the characteristic may pertain to a vision impairment of the user and the at least one setting may be an accessibility setting related to presenting visual content in a larger font size, zooming in on visual content, and/or audibly presenting text presented on a display. In other examples, the characteristic may pertain to a hearing impairment of the user and the at least one setting may be an accessibility setting related to presenting audible content as text on a display and/or turning on closed captioning for audio video content.

Also, in some implementations the at least one setting may be changed based on the identification of the characteristic and based on data indicated in an accessibility setting history, where the accessibility setting history may indicate one or more changes to the at least one accessibility setting that have occurred in the past.

The details of present principles, both as to their structure and operation, can best be understood in reference to the accompanying drawings, in which like reference numerals refer to like parts, and in which:

BRIEF DESCRIPTION OF THE DRAWINGS

FIG. 12 shows an example graphical user interface (GUI) that may be presented on a display for configuring one or more content presentation settings in accordance with present principles.

DETAILED DESCRIPTION

Figure 1:
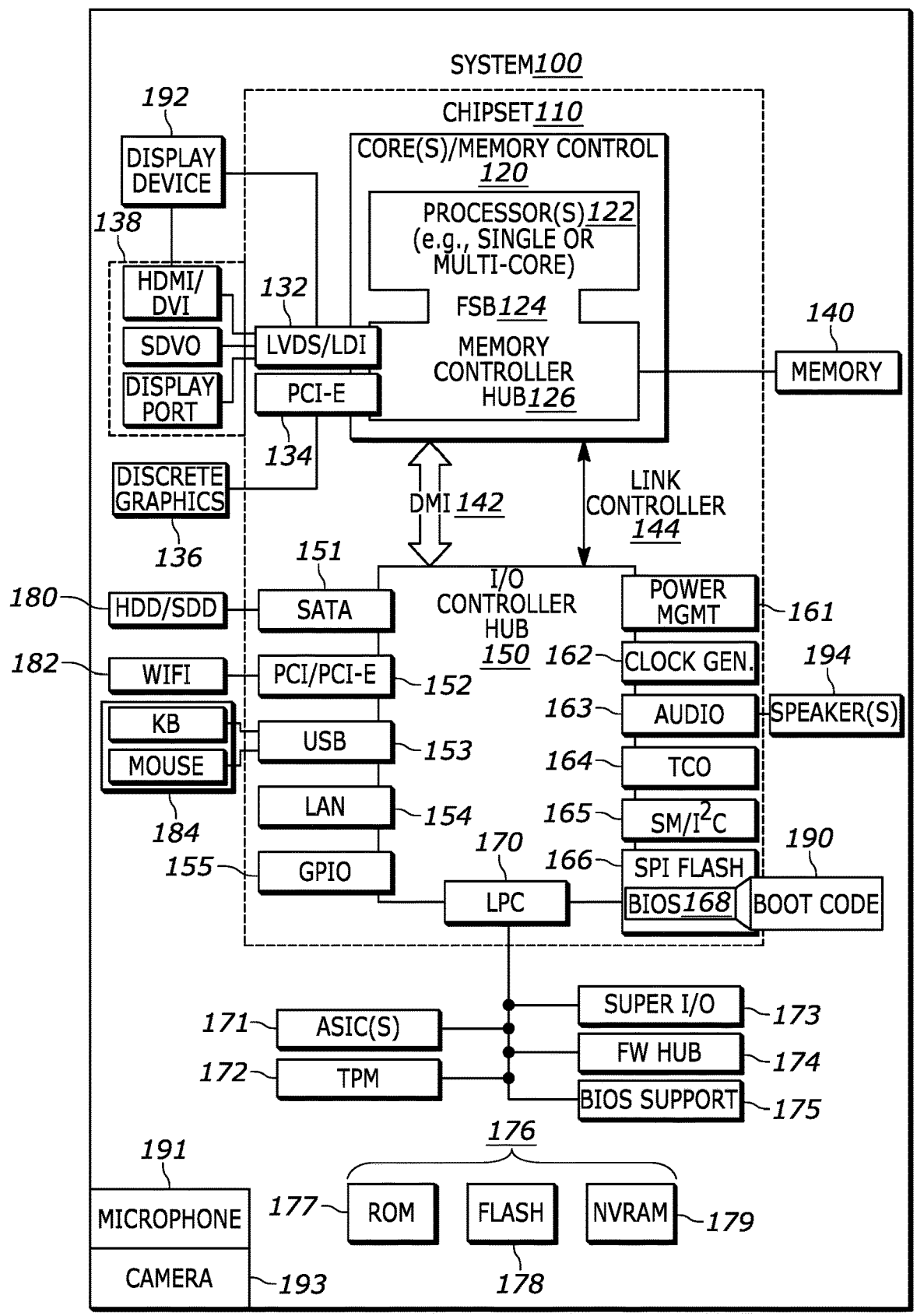
FIG. 1 is a block diagram of an example system in accordance with present principles.

As recognized by the present application, many children, elderly, and people with certain disabilities may wish to use a computer such as a laptop, smart phone, tablet, etc. but may not be able to themselves configure the computer to their needs. For instance, many visually impaired users may not be able to adequately see a settings menu in order to adjust settings for visual content to their needs. Others might have motor skills impairments that also make it hard or impossible for them to adjust computer settings to their needs. Children who may wish to use a computer to view a movie or other audio video (AV) content may not even be able to read yet and can therefore not adjust settings themselves or even understand the relevance of certain settings. As another example, elderly people may wish to use a computer but also might not be able to decipher and successfully navigate through somewhat complex settings menus. Or, a user may speak one language and not be able to understand another language used for settings on a shared computer, and therefore cannot decipher how to change any of those settings to help him or her observe content in the person's own language. As yet another example, if a user without perfect vision typically wears glasses or contacts but happens to not have them nearby when wishing to view content via a computer, the user may not be able to adequately see any related settings to adjust to help them view the content. Thus, the present application discloses improvements to computer functionality and device-based user interfaces for various users since the users being able to adjust the settings themselves might not even be a possibility.

Accordingly, consistent with present principles a device may detect certain conditions where an alternate device mode may be desirable and manifest the result of that detection to the user or apply it per policy, history, or dynamic preference (e.g., time of day, location, etc.). The detection could occur by various means such as camera input, microphone input, and/or wireless device proximity. The device may even identify the user specifically, or simply categorize the user into a known user type that would be better served by a change to the device user interfaces, settings, and/or feature utilization. For example, a camera may be used for the device to identify a known/registered user or simply that the user is a child. A microphone may also be used to identify that a user is speaking Spanish or that the user is a known user that prefers to speak Spanish. Once the device identifies a mismatch between the user and the interface(s) or features, the device may switch to a preferred mode of operation for that user type (e.g., adjust accessibility settings).

For example, a child that might not be able to read yet may pick up a family tablet and open a video game. The game might involve a lot of reading, which would thus be problematic for the child. In this case, the device may detect the user/type (a child in this case) and turn on a non-reader-friendly mode dynamically (e.g., to audibly read the text presented on the display to the child).

As another example, a user whose first language is Spanish may be speaking to another person in Spanish but a device that person is holding is presenting user-selectable controls and text in English. In this example, the device may switch the controls or text to Spanish, or at least prompt the user via a graphical user interface regarding whether that person would like to switch the controls to Spanish based on the detected speech.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides audio input to the processor 122 based on audio that is detected, such as via a user providing audible input to the microphone. The system 100 may also include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
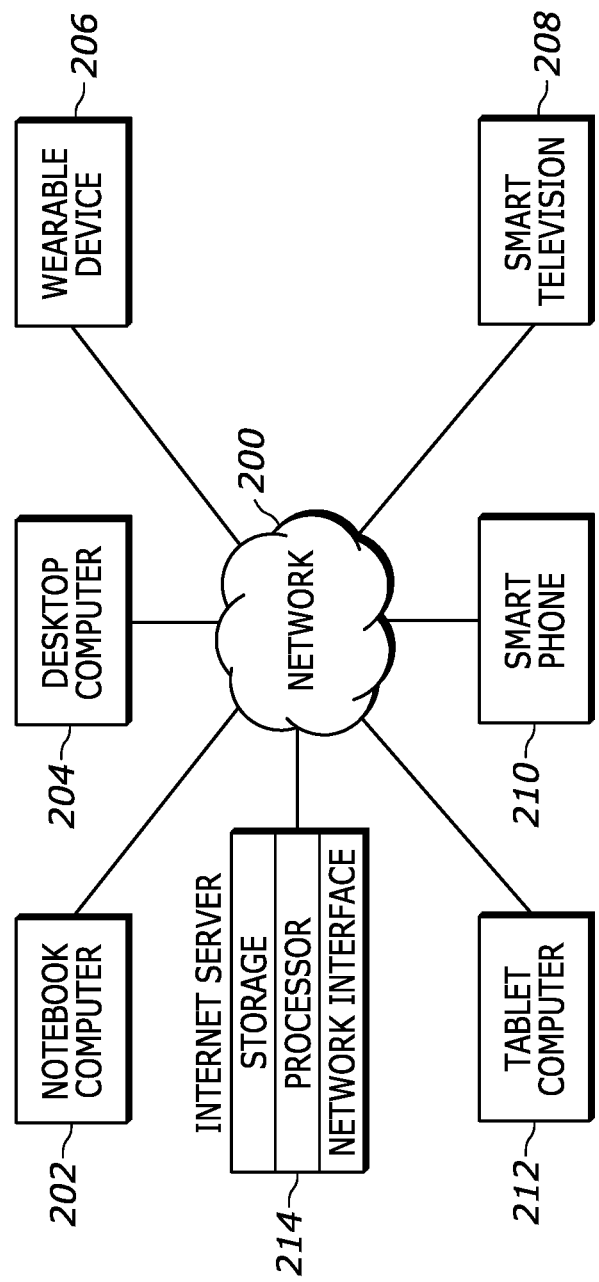
FIG. 2 is a block diagram of an example network of devices in accordance with present principles.

Turning now to FIG. 2, example computing devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
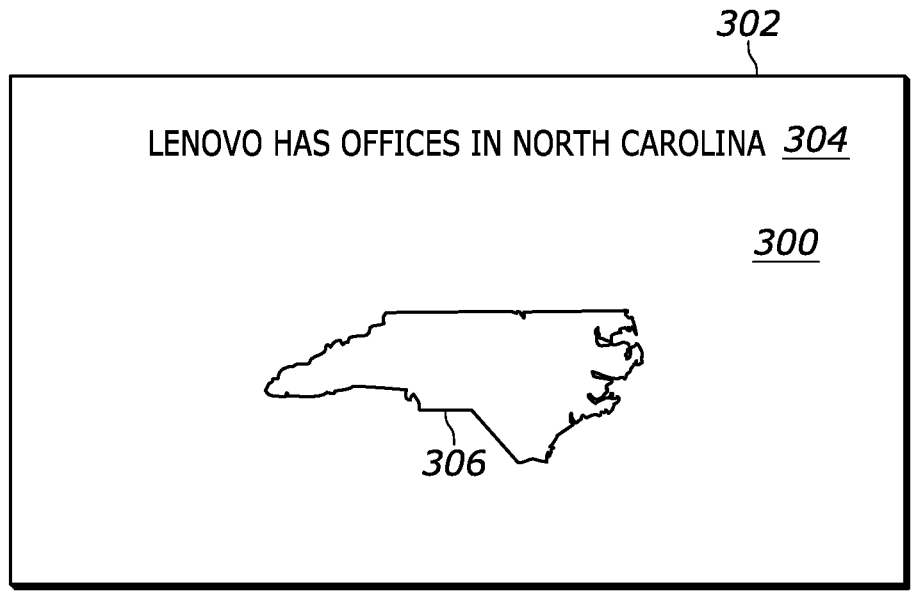
FIG. 3 shows content that may be presented according to default settings for a device.

Now in order to describe certain examples in which settings (e.g., accessibility settings) may be altered by a device, reference is made to FIGS. 3-10. FIG. 3 shows an example of visual content 300 being presented on an electronic display 302 prior to alteration by the device. For example, FIG. 3 shows the visual content 300 as may be presented by default for an adult user that does not have a vision impairment (e.g., poor vision or no vision ability). As part of this visual content 300, text 304 may be presented according to a default font size and an image 306 may also be presented according to a default size, both of which may be set by the content provider, a manufacturer of the device, the developer of an application used to present the content 300, etc. As may be appreciated from FIG. 3, the text 304 indicates "Lenovo has offices in North Carolina" and the image 306 is an outline of the shape of the state of North Carolina.

Figure 4:
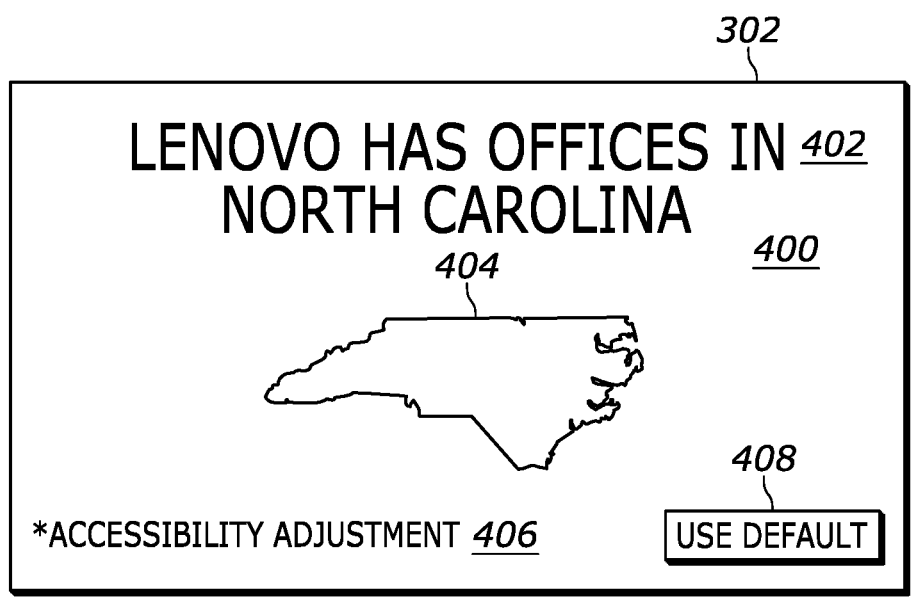
FIGS. 4-8 show content that may be presented according to settings adjustments made based on detection of a particular user or type of user.

Should a user with a vision impairment not be able to adequately view the content 300 owing to the relatively small size in which it is presented on the display 302, FIG. 4 shows an example of how the device may adjust the content 300 for the visually impaired user after detecting that the user is visually impaired. Thus, as shown in FIG. 4, the content 300 has been converted to content 400, with the font size of the text 304 being enlarged to render text 402 that indicates the same characters as the text 304 but with a relatively larger font size (e.g., font size 30 rather than font size 12). The image 306 has also been zoomed in on relative to FIG. 3 to render image 404, which may be the same as image 306 but enlarged as presented on the display 302 to make viewing it easier for the visually impaired user.

Also note that in some embodiments, responsive to a settings adjustment like the one shown, an indication 406 of the settings adjustment may be presented on the display (and/or audibly as well) to notify the visually impaired user and others that settings have been adjusted from their defaults for content presentation. But should the visually impaired user or another person wish to revert to defaults for some reason, the selector 408 that is overlaid on the content 400 as presented on the display 302 may be selected to command the device to revert to the default settings.

Figure 5:
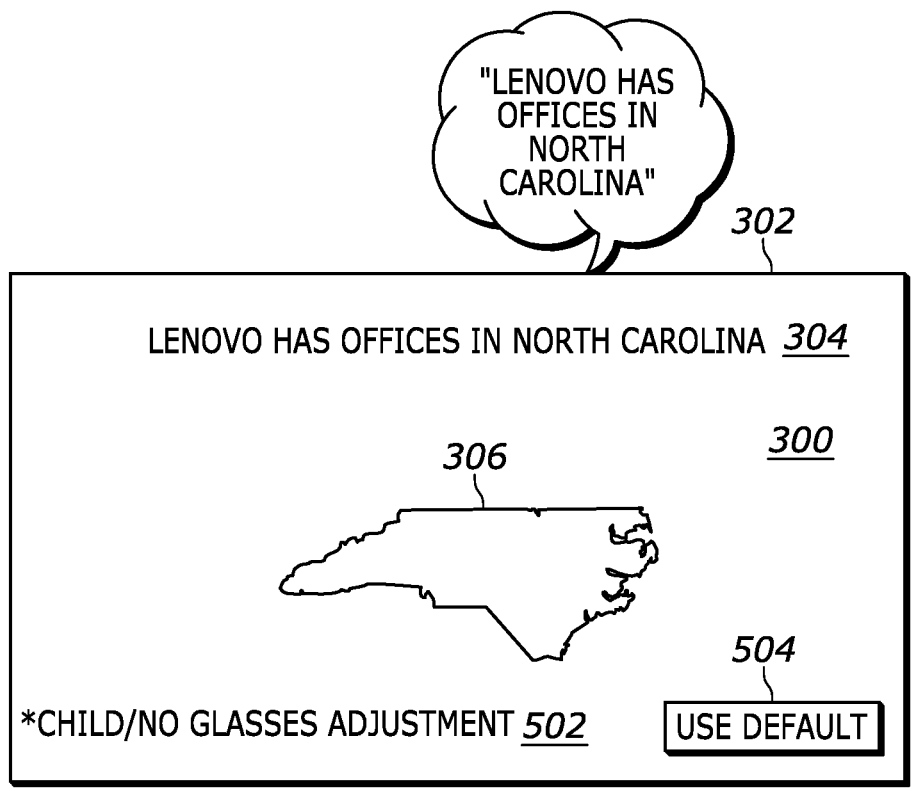

FIG. 5 shows another example of a settings adjustment that may be performed, this time in relation to a user who might have a hearing impairment, a child user that might not be able to read in any language yet, or a user who typically wears glasses but who the device detects is not currently wearing glasses. As shown, the visual content 300, including the text 304 and image 306, may be presented per default settings similar to as shown in FIG. 3. However, in this example, audio bubble 500 represents that the text 304 may also be converted to audio using text to speech software and then presented audibly by the device controlling the display 302. The text may be read aloud using one or more speakers on or in communication with the device.

As also shown in FIG. 5, in some cases the display 302 may present an indication 502 of the type of adjustment that was made based on the type of user that was detected. As shown, two things are indicated as being detected—a child is indicated as being detected by the device as well as a user that typically (e.g., more than a threshold non-zero number of past instances) wears glasses as being detected as not currently wearing glasses (also the child in this example). However, also note that other text may also be presented as part of the indication 502, such as "accessibility adjustment" similar to the indication 406 and/or "hearing impairment adjustment" specifically in relation to the particular type of adjustment that was made. Also note that a selector 504 may be presented according to this example, which may be selected to command the device to revert to the default settings.

Figure 6:
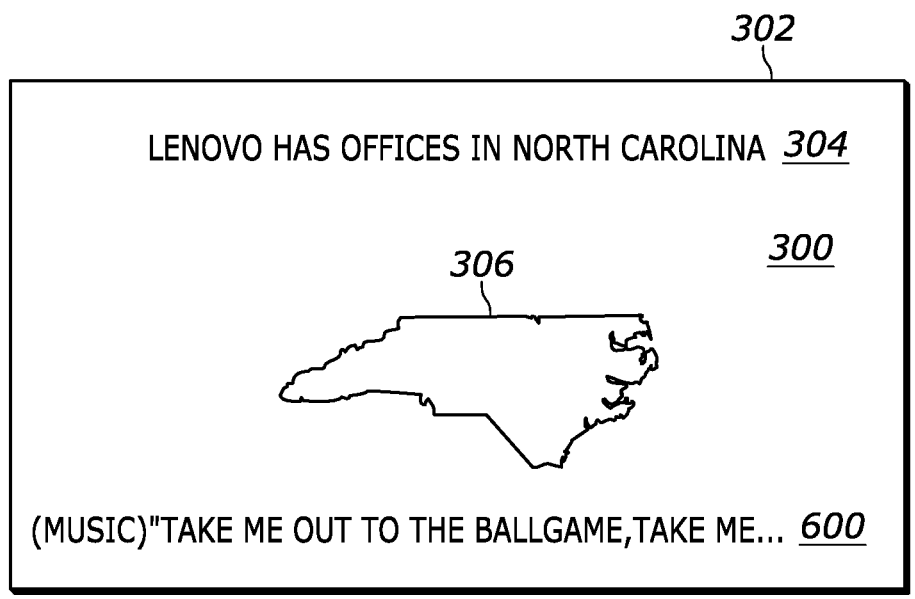

FIG. 6 shows another example of a settings adjustment that may be performed consistent with present principles based on the device detecting a hearing-impaired user. Content 300 is again presented, which includes both the text 304 presented according to its default font size and the image 306 presented according to its default size. Also note that audible content (e.g., music) unrelated to the content 300 but that is being concurrently presented using the device is also represented on the display 302 as text 600. The text 600 for the unrelated audible content may be generated based on the device executing speech to text software while using the original audio as input, based on identification of closed captioning data accompanying the unrelated audible content and indicating the text 600, and/or based on identification of metadata accompanying the unrelated audible content and indicating the text 600. The words of the unrelated audible content may thus be presented as text 600 on the display 302 along with any descriptions of the audio content that might also help convey the substance of the audible content, such as "(music)" as shown or any other indicators that might also be used during presentation of closed captioning. Note that in this example, the audible content is a rendition of the famous song "Take Me Out to the Ball Game".

Figure 7:
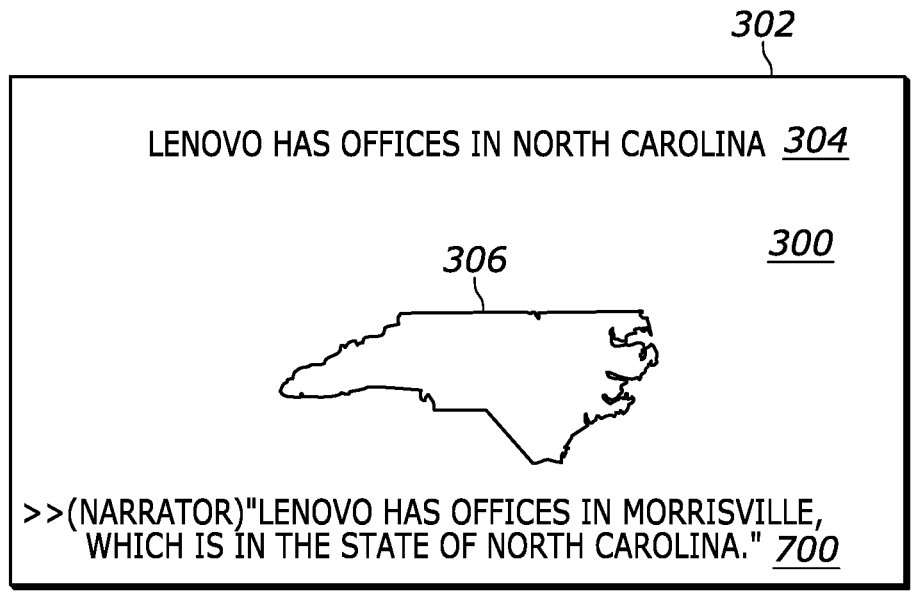

Now in reference to FIG. 7, assume that the visual content 300 is also accompanied by audio content as part of an audio video (AV) content presentation. Owing to the device detecting a hearing-impaired user, the device may turn on closed captioning in the device's accessibility settings and accesses closed captioning data for the AV content that might be included in a file for the AV content or even streamed to the device with the AV content. The device may then use the closed captioning data to present closed captioning 700 that corresponds to the audio component of the AV content. So, for example, the audio may read the text 304 aloud but may also indicate other words and even music that are not otherwise represented visually on the display 302. In this example, the closed captioning 700 indicates an identity of a speaker of the audio (the AV content's narrator in this case), as well as text corresponding to the words spoken by the speaker ("Lenovo has offices in Morrisville, which is in the state of North Carolina." in this case).

Figure 8:
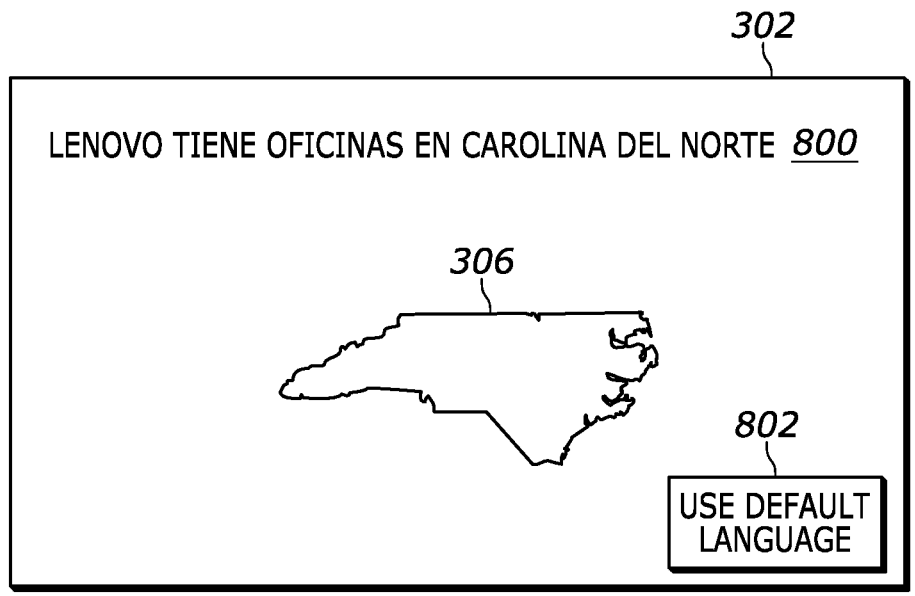

Moving on in the detailed description to FIG. 8, it shows yet another example of an accessibility settings adjustment consistent with present principles. In this example, assume the device has profiled/characterized a user disposed near the device as preferring to use one language (Spanish) different from another language (English) in which the content 300 would otherwise be presented or for which it was originally formatted or created. The device may identify as much by executing multi-language speech to text software or even executing separate speech to text software for various languages to determine in which language the user might be speaking based on the outputs from the software. The user's speech may itself be detected via a microphone and the user's speech may or may not be related to the content 300 itself.

Based on detecting that the user is speaking a different language than the one associated with the content 302 (e.g., as indicated in metadata accompanying the content 302 or as identified from the content 302 itself), the device may assume the language in which the user is speaking is the user's preferred language and convert at least some of the content 302 into the user's preferred language, as indicated via text 800. Any visual images from the content 302, such as the image 306, may remain the same as in the original version of the AV content save for any text shown in the images, which may also be converted to the user's preferred language and overlaid on the image with the original text being removed.

In terms of the content's text, in this example the device may convert presented text from English to Spanish using a machine translation webpage available over the Internet or using language translation software. In terms of audio, the device may use an auto-generated voice and text to speech software to speak the audio in Spanish after having identified the English audio using speech to text software and converting it to Spanish. Additionally or alternatively, the device may present representations of the audio on the display 302 as Spanish closed captioning after having converted the English audio to text using speech to text software and then converting the English text to Spanish for the user to read it on the display 302. As another example, if closed captioning in alternate languages has already been made available for the AV content by the AV content's provider, that closed captioning for the user's preferred language may be used.

FIG. 8 also shows that in some examples, a selector 802 may be presented. The selector may be selected to command the device to revert to the AV content's original language or to cause a graphical user interface to be presented on the display 302 from which the user may select another alternate language in which to present the AV content.

Figure 9:
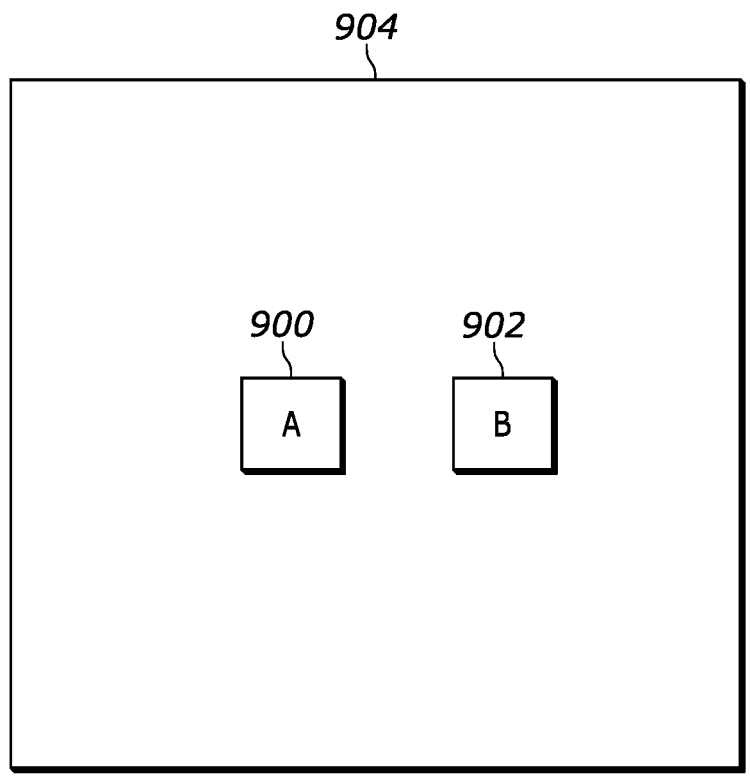
FIG. 9 shows example selectors that may be presented according to default settings for a device.
Figure 10:
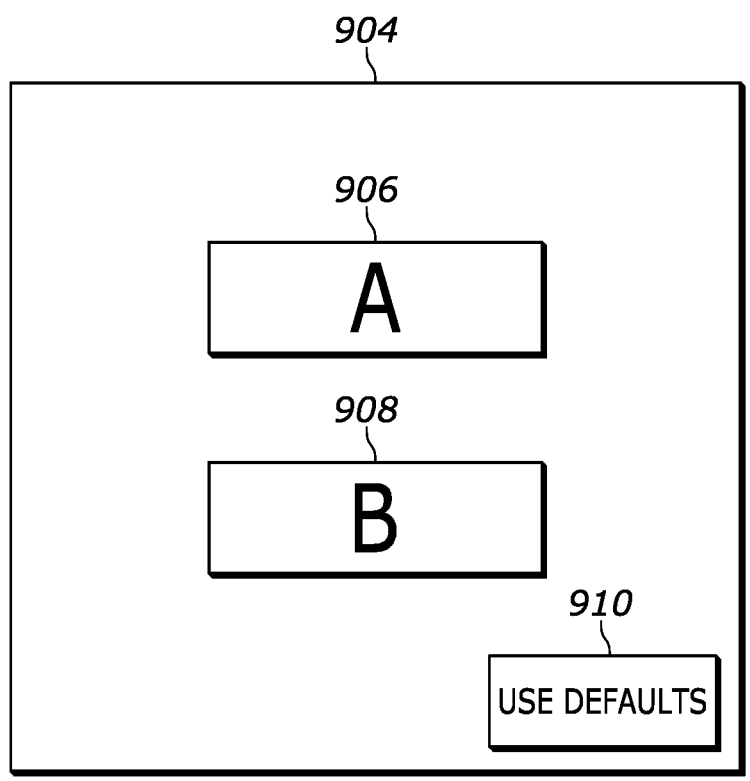
FIG. 10 shows example selectors that may be presented according settings adjustments made based on detection of a particular user or type of user.

Now in reference to FIGS. 9 and 10, they show an example of an accessibility settings adjustment that may be made for a user that may have a motor skills impairment. The user may be identified as having such an impairment based on the device characterizing the user's fine motor skill ability using an artificial intelligence neural network for identifying as much, based on identifying the user himself or herself (e.g., using facial recognition) if the user has already been registered with the device as having a motor skills impairment, based on identifying a threshold non-zero number of incorrect inputs from the user to the display, or based on identifying a threshold non-zero number of consecutive inputs to areas of the display that are not presenting any items for selection.

FIG. 9 shows two selectors 900 and 902 presented on a display 904. These selectors may be presented according to default presentation settings for the device, for the selectors themselves, etc. Then as shown in FIG. 10, responsive to identifying the user's motor skills impairment (e.g., difficulty selecting the relatively small selectors 900, 902), the device may enlarge the selectors 900, 902 and even reformat their presentation as shown to render respective selectors 906, 908 corresponding to the selectors 900, 902. The selectors 906, 908 are understood to each be selectable to input a same respective command as the selectors 900, 902, but owing to the enlargement of the selectors 906, 908 the user with the motor skills impairment may be able to more easily select the desired selector from the display (e.g., using touch input if the display is touch-enabled, and/or by moving a cursor over one of the selectors 906, 908 to select it with a mouse or track pad). Also note that in some embodiments, a selector 910 may be presented that may be selectable to revert to the default settings for presentation of selectors to thus revert back to presentation of the selectors 900, 902 as shown in FIG. 9.

Figure 11:
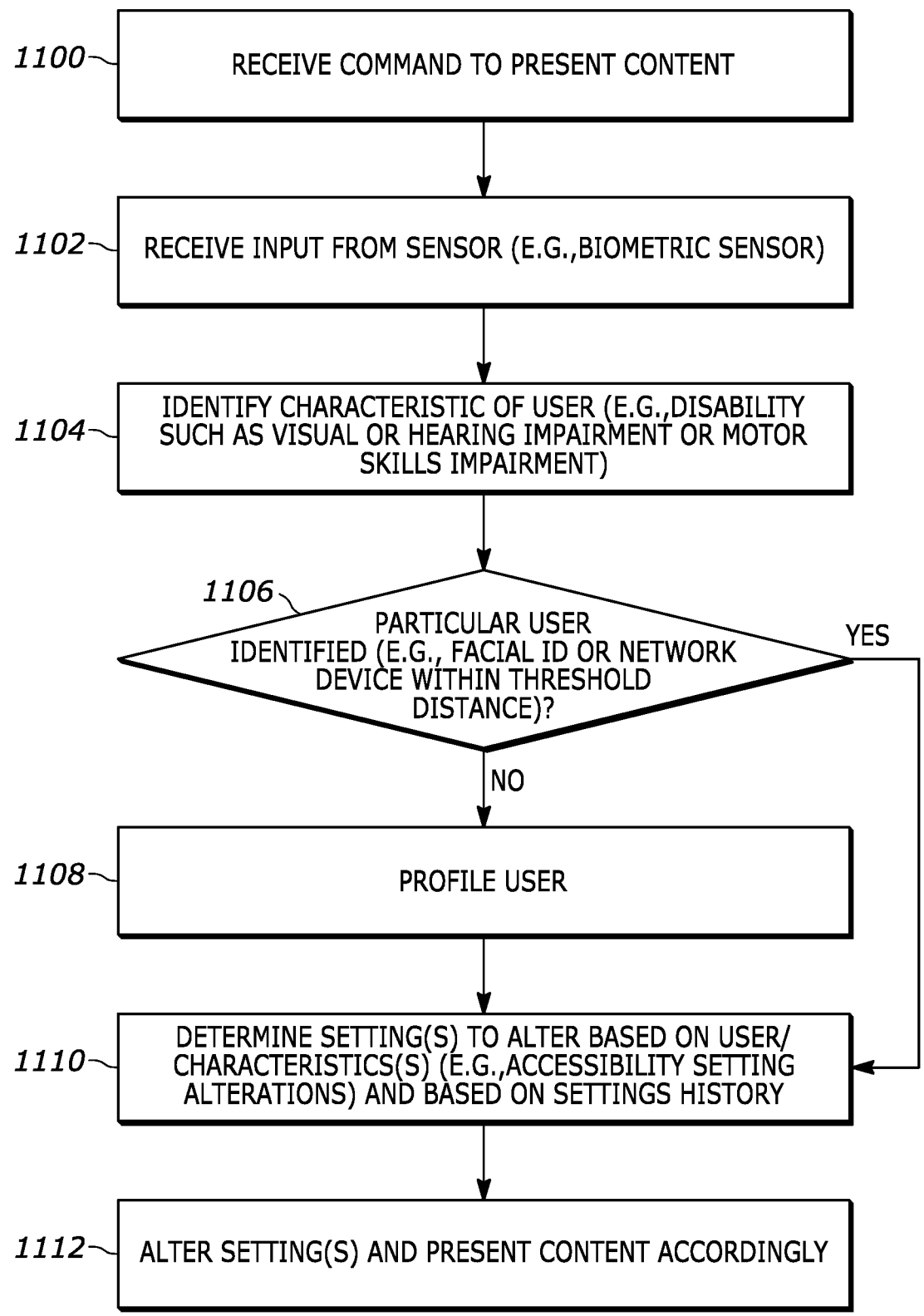
FIG. 11 is a flow chart of an example algorithm in accordance with present principles.

Referring now to FIG. 11, it shows example logic that may be executed by a device such as the system 100 and/or any of the other devices described above in accordance with present principles. Beginning at block 1100, the device may receive a command to begin presenting content. For example, the device may receive user input selecting a particular AV content file to present, user input to present a word processing document, user input to present a web page accessible over the Internet, etc.

From block 1100 the logic may then proceed to block 1102 where the device may receive input from one or more sensors accessible to the device, such as a camera, microphone, biometric sensor and/or network interface located on the device or otherwise in communication with it. From block 1102 the logic may then move to block 1104 where the device may identify one or more characteristics of the user based on the input, such as a vision impairment, hearing impairment, or motor skills impairment.

Thus, in some embodiments at block 1104 the device may actually identify a particular user based on the one or more characteristics, such as identifying the user via camera input and facial recognition using one or more identified characteristics of the user's face or identifying the user via microphone input and voice recognition using one or more identified characteristics of the user's voice. The particular user may also be identified based on identification of an internet protocol (IP) address or media access control (MAC) address of another device communicating over the same network that is associated with the user and that is detected via a network interface as being within a threshold distance to the device undertaking the logic of FIG. 11 (e.g., using a received signal strength indicator (RSSI) algorithm). Fingerprint identification and other types of biometric identification may also be used.

Additionally or alternatively, at block 1104 the device may profile the user via camera or microphone or other input without specifically identifying the user. For example, the user may be profiled as a child, an elderly person, a person with a vision impairment, a person with a hearing impairment, a person with a motor skills impairment, etc. based on input from the camera and execution of object and/or facial recognition software. A child or elderly person may also be identified based on microphone input and execution of voice identification software to correlate the sound of the user's voice to either that of a child, middle-aged adult, or elderly person.

As another example, to identify a vision impairment the device may use camera input to identify the user as wearing glasses having a thickness of more than a thickness threshold, wearing prescription glasses, wearing glasses with frames associated with having a vision impairment, etc. As yet another example, to identify a hearing impairment, the device may use camera input to identify the user as wearing hearing aids or as coming closer to the device when audio is presented (implicating the user as having trouble hearing the audio).

Still in reference to FIG. 11, from block 1104 the logic may then move to decision diamond 1106. At diamond 1106 the device may determine whether a particular user has been identified, such as using facial recognition, voice recognition, an IP address or MAC address, etc. as described above. Responsive to an affirmative determination at diamond 1106, the logic may proceed to block 1110 which will be described shortly.

However, responsive to a negative determination at diamond 1106, the logic may instead proceed to block 1108 where the device may profile or characterize the user as described above. A user may also be profiled by receiving input via the device's network interface to identify the user not by user identity per se but as being associated with a particular IP address or MAC address for a device that was within a threshold distance of the device undertaking the logic of FIG. 11 in the past when a particular settings adjustment was made (e.g., as indicated in a settings history). Matching a face or voice to a previously detected face or voice when a settings adjustment was made in the past may also be used even if the user cannot be identified by user ID per se.

From block 1108 the logic may then proceed to block 1110. At block 1110 the device may determine one or more settings to alter based on the identified user and/or profiled user characteristics and then alter those settings accordingly at block 1112. For example, if a particular user has been identified, a history of previous accessibility settings adjustments that the device itself made in the past may be accessed, and then the device's settings may be adjusted to conform to those previous settings from the history. As another example, if a particular user has been identified as having a certain disability or impairment, accessibility settings to address that impairment as set forth herein may be made (e.g., using a larger font preestablished for visually impaired users if the person has a vision impairment, and representing audio as text using speech to text software if the person has a hearing impairment).

Continuing the detailed description in reference to FIG. 12, it shows an example settings graphical user interface (GUI) 1200 for configuring one or more settings in accordance with present principles, such as accessibility settings for a visually or hearing impaired user. Each of the settings to be described below may be selected by directing touch or cursor input to the respective check box adjacent to the respective setting.

As shown, the GUI 1200 may include a first setting 1202 that is selectable to enable the device to perform settings alterations in accordance with present principles. For example, the setting 1202 may be enabled for the device to undertake the functions described above with respect to FIGS. 4-10 and/or the logic of FIG. 11.

The GUI 1200 may also include one or more particular accessibility settings to configure. But before describing those, note that options 1204, 1206, and 1208 may be selected for selecting a type of user (e.g., users with disabilities per option 1204 or children and the elderly per option 1208) or a particular user (e.g., registered user "Nathan" per option 1206) for which the settings below the options 1204-1208 may be configured so that a person can toggle between users/user types for settings configurations.

Then, as shown below the options 1204-1208, the settings may include a setting 1210 that may be selected to set an accessibility setting for large/larger font to be used consistent with present principles. Setting 1212 may be selected to set an accessibility setting for visual content to be zoomed in on consistent with present principles. Setting 1214 may be selected to set an accessibility setting for text presented on a display to be presented audibly consistent with present principles. Setting 1216 may be selected to set an accessibility setting for audio to be represented as text consistent with present principles. Setting 1218 may be selected to set an accessibility setting to present closed captioning for AV content consistent with present principles. Setting 1220 may be selected to set an accessibility setting for content to be presented according to a user's preferred language consistent with present principles.

Also note that owing to the option 1206 for Nathan being currently selected in this example, the GUI 1200 may dynamically present additional settings specifically tailored for Nathan. These settings may include a setting 1222 that is selectable to set the device to perform accessibility adjustments for selected settings 1210-1220 for Nathan only when the device detects that Nathan is not wearing eye glasses. These settings may also include a setting 1224 that is selectable to set the device to perform accessibility adjustments for selected settings 1210-1220 for Nathan only during a designated time that may be defined by providing input to beginning time input box 1226 and ending time input box 1228. Additionally, these settings may include a setting 1320 that is selectable to set the device to perform accessibility adjustments for selected settings 1210-1220 for Nathan only at one or more user-defined locations, with input box 1232 being able to receive user input indicating the location(s) via GPS coordinates, street addresses, or predefined user designations for particular locations that might themselves be defined by GPS coordinates or street addresses (e.g., "Home" in this case).

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   receive input from at least one sensor;
   determine, based on the input, whether a user has a motor skills disability; and
   based on a determination that the user has a motor skills disability, alter an accessibility setting of the device.

2. The device of claim 1, wherein the at least one sensor comprises a microphone accessible to the at least one processor.

3. The device of claim 1, wherein the instructions are executable to:
   alter the accessibility setting of the device based on the determination of a motor skills disability and based on identification of a first current time of day; and
   decline to alter the accessibility setting of the device based on identification of a second current time of day different from the first current time of day.

4. The device of claim 1, wherein the instructions are executable to:
   alter the accessibility setting of the device based on the determination of a motor skills disability and based on identification of a first current location of the device; and
   decline to alter the accessibility setting of the device based on identification of a second current location of the device that is different from the first current location of the device.

5. The device of claim 1, wherein the device is a first device, wherein the at least one sensor comprises a network interface, and wherein the first device uses identification of a second device as being within a threshold distance of the first device to determine that the accessibility setting of the first device is to be altered, the second device associated with the user, the second device being different from the first device, the identification of the second device as being within the threshold distance to the first device being based on input from the network interface and execution of a received signal strength indicator (RSSI) algorithm.

6. A method, comprising:
   receiving input from at least one sensor;
   identifying a characteristic of a user based on the input from the at least one sensor; and
   altering at least one setting of a device based on the identifying of the characteristic, the at least one setting related to presentation of content using the device;
   wherein based on identifying that a particular user has worn eye glasses in the past but is not currently wearing eye glasses, altering the at least one setting by one or more of: presenting text on a display in a relatively larger font size than a default font size, audibly representing text presented on the display.

7. The method of claim 6, comprising:
   profiling the user based on input from the at least one sensor; and
   altering the at least one setting based on the profiling;
   wherein the user is profiled as a child, and wherein the altering the at least one setting comprises configuring a first setting for the device to audibly represent text presented on a display.

8. The method of claim 6, comprising:
   profiling the user based on input from the at least one sensor; and
   altering the at least one setting based on the profiling;
   wherein the user is profiled as an elderly person, and wherein the altering the at least one setting comprises configuring a first setting for the device to present text on a display in a relatively larger font size than a default font size.

9. The method of claim 6, wherein the device is a first device, wherein the at least one sensor comprises a network interface, and wherein identification of a second device as being within a threshold distance to the first device is used to identify that the at least one setting is to be altered, the second device associated with the user, the identification of the second device as being within the threshold distance to the first device being based on input from the network interface.

10. The method of claim 6, wherein the method comprises:
  based on identifying that the particular user has, in the past, worn eye glasses more than a threshold non-zero number of past instances but is not currently wearing eye glasses, altering the at least one setting by one or more of: presenting text on a display in a relatively larger font size than a default font size, audibly representing text presented on the display.

11. The method of claim 6, wherein the at least one sensor comprises a camera, and wherein the method comprises:
  identifying the characteristic based input from the camera to identify the eye glasses as having a thickness of more than a thickness threshold.

12. The method of claim 6, wherein the at least one sensor comprises a camera, and wherein the method comprises:
  identifying the characteristic based input from the camera to identify the user as wearing prescription glasses.

13. The method of claim 6, wherein the at least one sensor comprises a camera, and wherein the method comprises:
  identifying the characteristic based input from the camera to identify the eye glasses as having frames associated with having a vision impairment.

14. A computer readable storage medium (CRSM) that is not a transitory signal, the computer readable storage medium comprising instructions executable by at least one processor to:
  receive input from at least one sensor accessible to the at least one processor;
  identify a characteristic of a user based on the input from the at least one sensor; and
  change at least one setting of a device based on the identification of the characteristic and based on one or more of: identification of a current time of day, identification of a current location of the device;
  wherein the at least one setting is related to presentation of content.

15. The CRSM of claim 14, wherein the instructions are executable to:
  change at least one setting of the device based on the identification of the characteristic and based on identification of a current time of day.

16. The CRSM of claim 15, wherein the instructions are executable to:
  present a graphical user interface (GUI) on a display accessible to the at least one processor, the GUI comprising at least one element at which user input is receivable to establish a time frame during which the at least one setting of the device is changed based on the identification of the characteristic.

17. The CRSM of claim 14, wherein the instructions are executable to:
  change at least one setting of the device based on the identification of the characteristic and based on identification of a current location of a device.

18. The CRSM of claim 17, wherein the instructions are executable to:
  present a graphical user interface (GUI) on a display accessible to the at least one processor, the GUI comprising at least one element at which user input is receivable to establish a first location at which the at least one setting of the device is changed based on the identification of the characteristic.

19. The CRSM of claim 18, wherein the user input as received via the GUI specifies the first location by global positioning system (GPS) coordinates and/or by street address.

20. The CRSM of claim 18, wherein the first location corresponds to the current location.

* * * * *